United States Patent
Ito

(10) Patent No.: US 7,367,086 B2
(45) Date of Patent: May 6, 2008

(54) STRING TYPE AIR DAMPER

(75) Inventor: Kiichiro Ito, Kanagawa (JP)

(73) Assignee: Piolax Inc., Yokohama-shi (JP)

( * ) Notice: Subject to any disclaimer, the term of this patent is extended or adjusted under 35 U.S.C. 154(b) by 0 days.

(21) Appl. No.: 10/665,260

(22) Filed: Sep. 22, 2003

(65) Prior Publication Data
US 2004/0055109 A1 Mar. 25, 2004

(30) Foreign Application Priority Data
Sep. 20, 2002 (JP) ............ P. 2002-275134

(51) Int. Cl.
*E05F 5/08* (2006.01)
*F16F 9/00* (2006.01)

(52) U.S. Cl. ............ 16/85; 16/66; 16/84; 188/322.18; 188/322.19; 267/221

(58) Field of Classification Search ............ 16/85, 16/84, 49, 61, 66, 63, 78, 44; 188/287–289, 188/322.18, 322.15, 322.22, 281, 282.2
See application file for complete search history.

(56) References Cited

U.S. PATENT DOCUMENTS

| | | | | |
|---|---|---|---|---|
| 4,856,625 A | * | 8/1989 | Oshida ............ | 188/282.1 |
| 5,333,845 A | * | 8/1994 | Seiichi ............ | 267/71 |
| 5,613,665 A | * | 3/1997 | Lund ............ | 267/69 |
| 5,845,749 A | * | 12/1998 | Moretz et al. ............ | 188/281 |
| 5,884,734 A | * | 3/1999 | Hiramoto et al. ............ | 188/322.18 |
| 6,119,832 A | | 9/2000 | Hofmann ............ | 188/322.13 |
| 6,189,662 B1 | * | 2/2001 | Bivens et al. ............ | 188/288 |
| 6,199,673 B1 | * | 3/2001 | Wach ............ | 188/322.18 |
| 6,220,583 B1 | * | 4/2001 | Ito ............ | 267/71 |
| 6,269,919 B1 | * | 8/2001 | Bivens et al. ............ | 188/288 |
| 6,345,583 B1 | * | 2/2002 | Thackston et al. ............ | 114/213 |
| 6,367,785 B1 | | 4/2002 | Nakabayashi et al. ............ | 267/71 |

(Continued)

FOREIGN PATENT DOCUMENTS

JP 5-76894 10/1993

(Continued)

OTHER PUBLICATIONS

Korean Office Action dated Sep. 11, 2006 (with English translation).

*Primary Examiner*—Robert J Sandy
*Assistant Examiner*—Ruth C. Rodriguez
(74) *Attorney, Agent, or Firm*—McGinn IP Law Group, PLLC

(57) ABSTRACT

A string type air damper includes a cylinder formed in a tubular shape, defining a guide hole at one end portion thereof, a piston, which moves in the cylinder, a helical spring for biasing the piston toward the other end portion of the cylinder, and a string member guided from inside of the cylinder to outside thereof through the guide hole. The piston and the string member are integrally formed. Since the string member is formed integrally with the piston, unlike a method according to a related art, it becomes unnecessary to form a loop at the base end portion of the string member with a complicated work and form a hook portion at the piston and hook the base end portion of the string member at the hook portion of the piston. Therefore, the string type air damper can be very easily assembled.

8 Claims, 12 Drawing Sheets

U.S. PATENT DOCUMENTS

| | | | |
|---|---|---|---|
| 6,442,796 B2 * | 9/2002 | Arisaka et al. | 16/84 |
| 6,460,839 B2 * | 10/2002 | Muller | 267/221 |
| 6,578,832 B2 * | 6/2003 | Katoh | 267/64.11 |
| 6,578,833 B2 * | 6/2003 | Arisaka | 267/71 |
| 6,669,178 B2 * | 12/2003 | Ookawara | 267/71 |
| 6,726,219 B2 * | 4/2004 | Bivens | 277/549 |

FOREIGN PATENT DOCUMENTS

| | | | |
|---|---|---|---|
| JP | 2000145862 A | * | 5/2000 |
| JP | 2001263399 A | * | 9/2001 |
| JP | 2004108543 A | * | 4/2004 |

* cited by examiner

STRING TYPE AIR DAMPER

The present disclosure relates to the subject matter contained in Japanese Patent Application No. 2002-275134 filed on Sep. 20, 2002, which is incorporated herein by reference in its entirety.

BACKGROUND OF THE INVENTION

1. Field of the Invention

The present invention relates to improvements in a string type air damper, for example, used for a glove box of an automobile.

2. Description of the Related Art

Although a specific example of this type air damper according to a related art is not shown in the drawing, it includes: a cylinder, both end portions of which are open; a piston moving in the cylinder; a string member, the base end of which is connected with the piston; a valve device for controlling a volume of air passing through the valve, attached to the other end side of the cylinder; a guide cap for guiding the string member, attached on one end side of the cylinder; and a helical compression spring for pushing the piston to the other end of the cylinder, interposed between the guide cap and the piston in the cylinder. For example, refer to Japanese Utility Model No. 2557064.

In the case where this string type air damper is used being attached to a glove box of an automobile, the following operation is conducted. The cylinder is fixed to an instrument panel side; a forward end of the string member, which is guided outside through the guide cap of the cylinder, is fixed to the glove box side; when the glove box is moved so that it opens, the string member is gradually drawn out from the cylinder; since the piston is moved in the same direction in the cylinder while resisting a force generated by the helical compression spring, air flows into the cylinder via the valve device, so that the damping effect can be provided and the glove box can be gradually opened.

On the contrary, when the glove box is moved so that it closes, the piston accompanied by the string member is forcibly pushed back by a force of the helical compression spring in the direction of the other end of the cylinder. Therefore, air accumulated in the cylinder is released outside through the valve device. Due to the foregoing, the piston quickly moves in the cylinder and facilitates a closing motion of the glove box.

However, in the string type air damper according to the related art, the following problems may be encountered. The string member and the piston are formed separately from each other. Concerning the string member, a loop is formed at the base end of the string member being accompanied by a complicated work. Concerning the piston, a hook is formed. The loop-shaped base end of the string member must be hooked at the hook portion of the piston. Therefore, this hooking work is complicated.

SUMMARY OF THE INVENTION

The present invention has been accomplished to effectively solve the above problems caused in the string-type air damper according to the related art. According to a first aspect of the invention, a string type air damper includes a cylinder, a piston, a helical spring, a string member. The cylinder is formed in a tubular shape and defines a guide hole at one end portion thereof. The piston moves in the cylinder. The helical spring biases the piston toward the other end portion of the cylinder. The string member is guided from inside of the cylinder to outside thereof through the guide hole. The piston and the string member are integrally formed.

According to a second aspect of the invention, in the first aspect, the string member branches into a plurality of portions and connects with the piston at a base end portion thereof. The portions come together at a forward end portion of the string member.

According to a third aspect of the invention, in the first aspect, the string member has a belt shape. The guide hole of the cylinder has a flat opening and a smooth arcuate face continuing to a wide width edge of the opening. The string member having the belt shape is bent and guided along the arcuate face of the guide hole.

According to a fourth aspect of the invention, the piston and the string member are formed of a first material. A reinforcing plate is formed of a second material harder than the first material. The reinforcing plate is attached to the piston to serve as a mount for receiving the helical spring.

According to a fifth aspect of the invention, a string type air damper includes a cylinder, a piston, a helical spring, a guide cap, and a string member. The cylinder is formed in a tubular shape. The piston moves in the cylinder. The helical spring biases the piston toward one end portion of the cylinder. The guide cap is attached to the other end portion of the cylinder and defines a guide hole. The string member is guided from inside of the cylinder to outside thereof through the guide hole. The guide cap and the string member are formed integrally. The string member is hooked to the piston within the cylinder and is guided to the outside thereof.

According to a sixth aspect of the invention, in the fifth aspect, the string member branches into a plurality of portions. A base end portion of the string member is connected to the guide cap. The plurality of portions come together at a forward end portion of the string member. The portions are hooked at the piston.

As described above, in the first aspect, the string member and the piston are formed integrally. Therefore, unlike the string type air damper according to the related art, it is unnecessary to form a loop at the base end of the string member being accompanied by a complicated work, and also it is unnecessary to form a hook portion in the piston and to hook the loop-shaped base end of the string member at the hook portion of the piston. Accordingly, the string type air damper can be very easily assembled.

In the second aspect, the string member branching into a plurality of portions supports the piston. Therefore, it can be guaranteed that the piston is stably moved in the cylinder. In the third aspect, the string member is formed into a belt shape. Therefore, it is possible to strengthen the string member itself. At the same time, the string member can be smoothly bent and guided along an arcuate face of the guide hole. In the fourth aspect, a reinforcing plate formed of the second material harder than the first material is provided on an upper face of the piston formed of the first material. Therefore, an end portion of the helical spring can be positively supported.

In the fifth aspect, the string member and the guide cap are integrally formed and the forward end portion of the string member is hooked at the piston and then introduced outside. Therefore, unlike the string type air damper according to the related art in which a loop is formed at the base end portion of the string member and the thus formed loop-shaped base end portion of the string member is hooked at the hook portion arranged in the guide cap being accompanied by a complicated work, it is unnecessary to do the above complicated work according to the present invention. Accordingly, the string type damper can be easily assembled.

In the sixth aspect, a plurality of branching string-shaped portions support the piston as a result. Therefore, it can be guaranteed that the piston is stably moved in the cylinder.

DETAILED DESCRIPTION OF THE PREFERRED EMBODIMENTS

Figure 1:
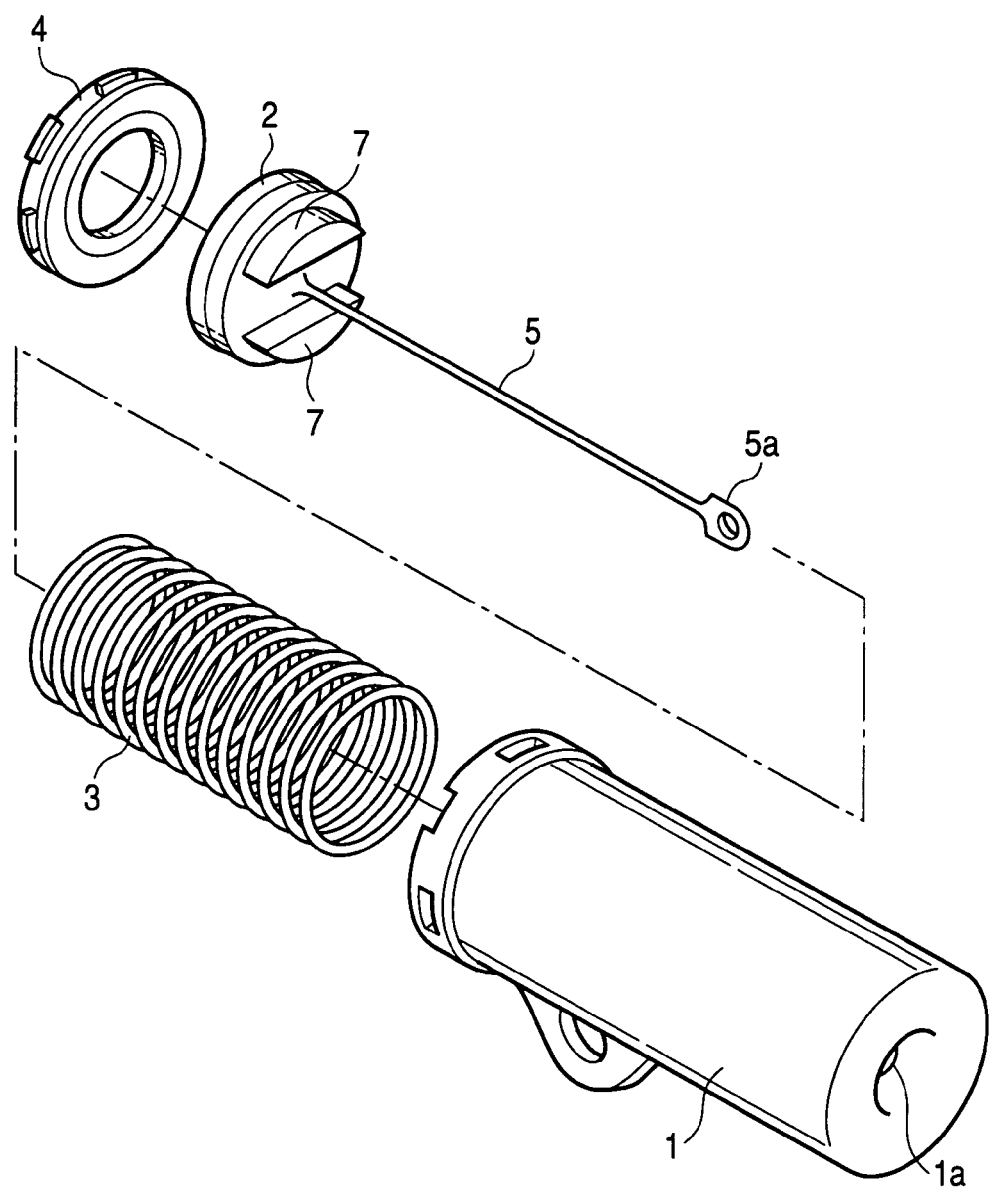
FIG. 1 is an exploded perspective view of the string type air damper according to the first embodiment of the present invention.

Referring to the drawings, preferred embodiments of the invention will be explained in detail as follows. As shown in FIG. 1, a string type air damper according to the first embodiment includes a cylinder 1, a piston 2, a helical compression spring 3, an end cap 4, and a string member 5. The cylinder 1 defines a guide hole 1a at one end portion thereof. The piston 2 moves in the cylinder 1. The helical compression spring 3 biases the piston 2 toward the other end portion of the cylinder 1. The end cap 4 is attached to the other end side of the cylinder 1. The string member 5 is connected with the piston 2 and guided outside through the guide hole 1a. In this connection, reference numeral 7 denotes a mount for receiving the end portion of the helical compression spring 3 provided in the piston 2.

Figure 2A:
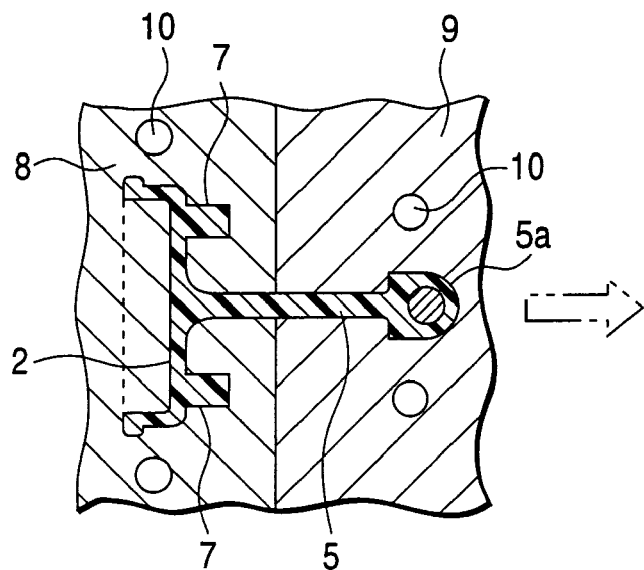
FIGS. 2A and 2B are schematic illustration showing a process in which a piston and string member are integrally formed by means of injection molding and the string member is elongated.
Figure 2B:
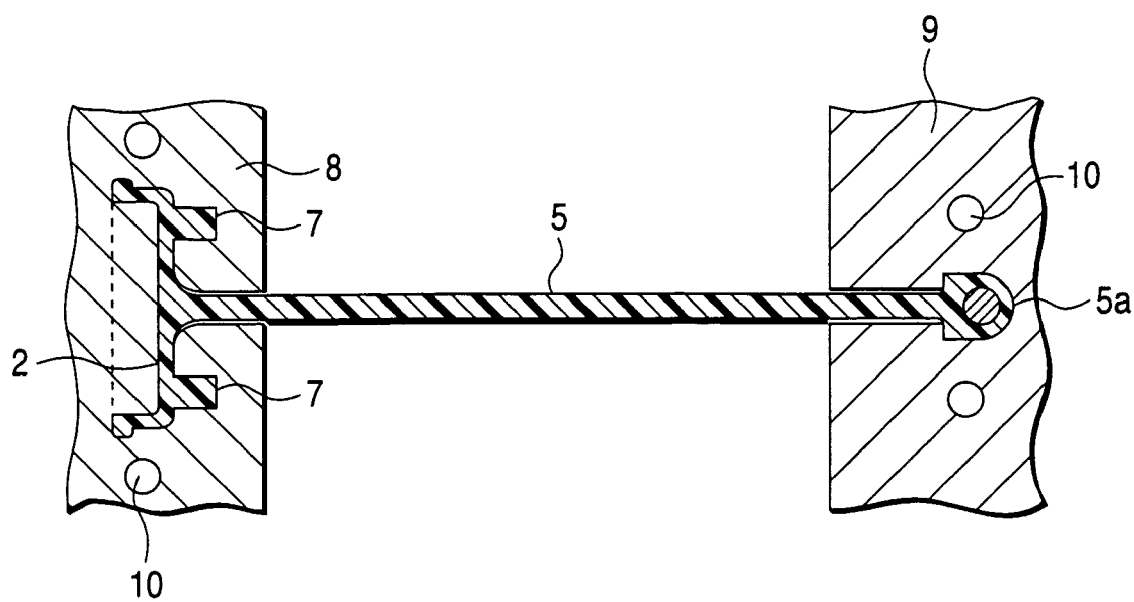

In the first embodiment, as shown in FIG. 2A, the piston 2 and the string member 5 having a large diameter and a short length are integrally formed by means of an injection molding using a metallic mold 8 for molding the piston and a metallic mold 9 for molding a forward end portion of the string member 5. After the completion of injection molding, as shown in FIG. 2B, when the metallic mold 9 for molding the forward end portion of the string member 5 is separated from the metallic mold 8 for molding the piston, the string member 5 having the large diameter and the short length is elongated to make the string member 5 have a small diameter and a long length. In this connection, reference numeral 10 denotes a cooling circuit provided in each metallic mold 8, 9. This cooling circuit 10 only cools the piston 2 and the forward end portion 5a of the string member 5, that is, this cooling circuit 10 does not cool an intermediate portion of the string member 5. Therefore, it can be guaranteed that the string member 5 is sufficiently elongated.

Figure 3A:
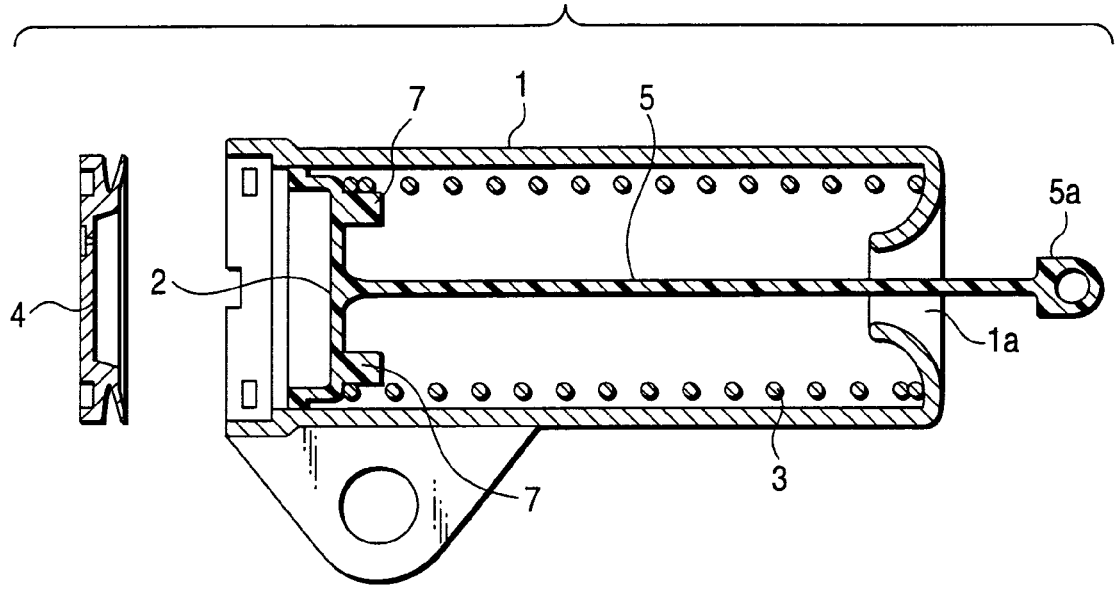
FIGS. 3A and 3B are sectional views showing an order of assembling a string type air damper according to the first embodiment.
Figure 3B:
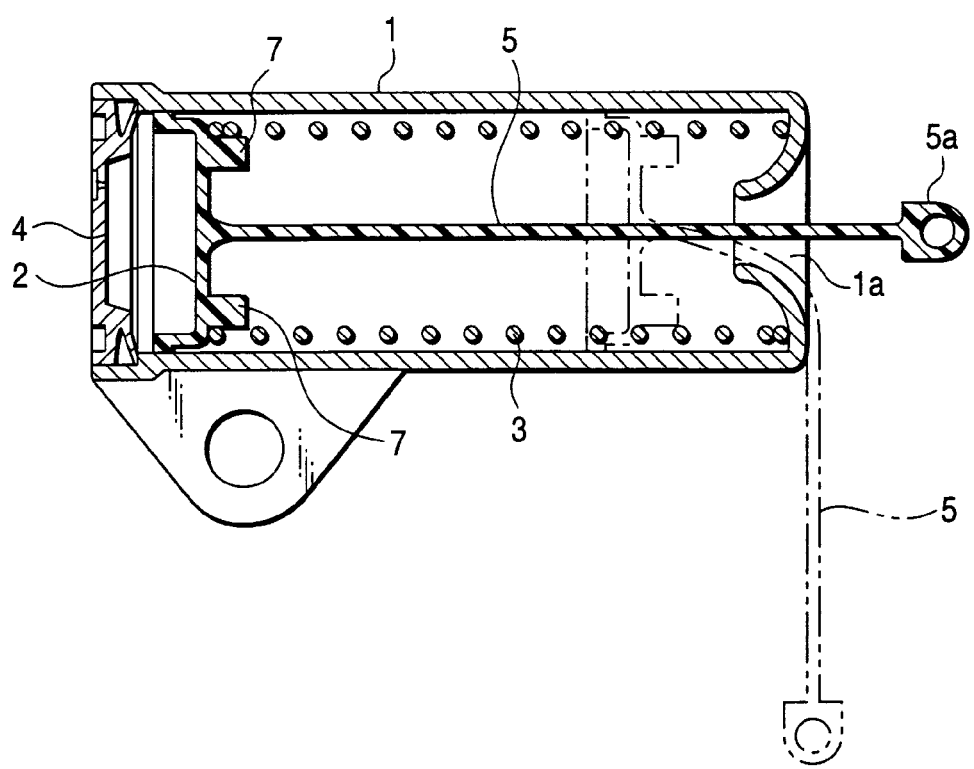

Accordingly, the string type air damper according to the first embodiment can be simply assembled as follows. It is noted that the piston 2 and the string member 5 have already been integrated. As shown in FIG. 3A, the helical compression spring 3 and the piston 2 are inserted into the cylinder 1, and the forward end portion 5a of the string member 5 is guided outside through the guide hole 1a. Then, as shown in FIG. 3B, the end cap 4 is attached to the other end portion of the cylinder 1. In this way, the string type air damper can be simply assembled. Accordingly, unlike the string type air damper according to the related art, it is quite unnecessary that a loop is formed at a base end portion of the string member with a complicated work and form a hook portion in the piston, and then hook the loop-shaped base end portion of the string member at the hook portion of the piston.

Figure 4A:
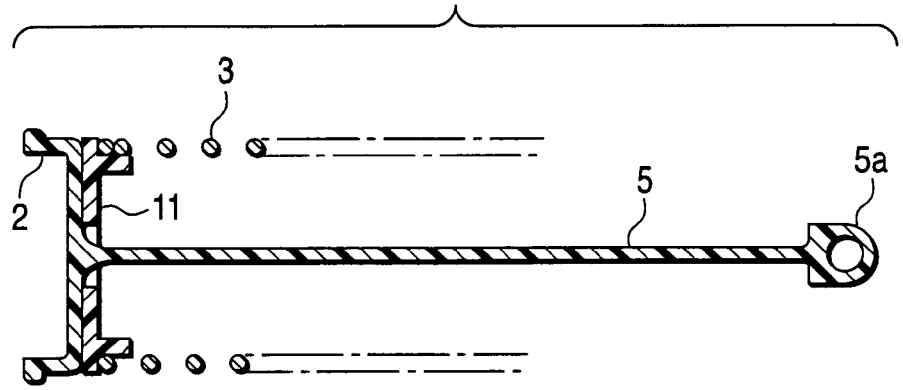
FIGS. 4A, 4B and 4C are sectional views showing a primary portion of another example according to the first embodiment.
Figure 4B:
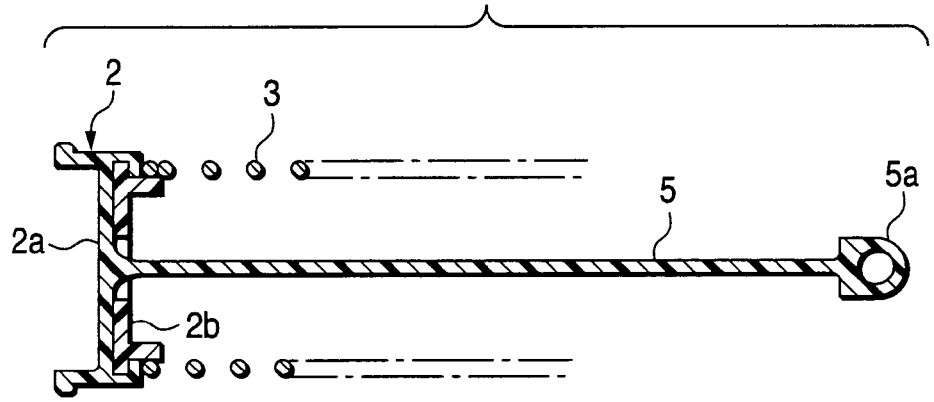
Figure 4C:
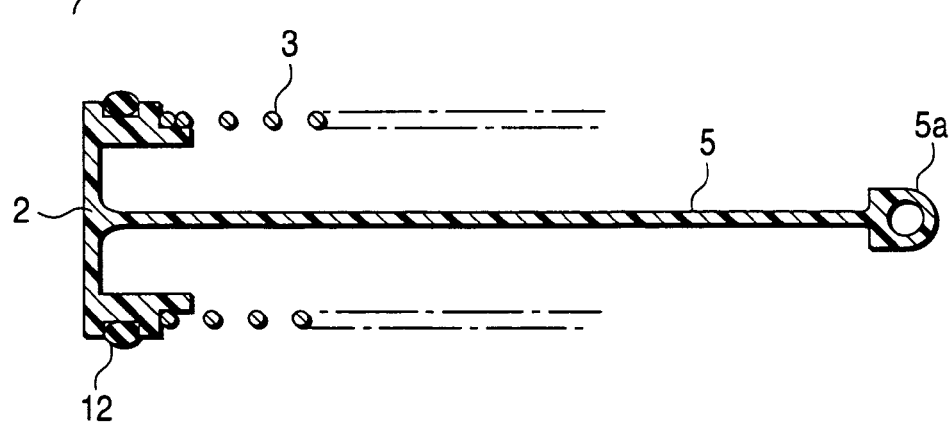

In this case, the following variations may be arbitrarily made. As shown in FIG. 4A, the piston 2 and the string member 5 may be integrally formed of soft synthetic resin, and a reinforcing plate 11 formed of hard synthetic resin, which functions as a receiving mount for receiving the helical compression spring 3, may be arranged on an upper face of the piston 2. Alternatively, as shown in FIG. 4B, the piston 2 includes a soft portion 2a and a hard portion 2b by means of an insert-molding or a bicolor-molding, and the string member 5 maybe elongated from the hard portion 2b, and the hard portion 2b may be also used as a receiving mount for receiving the compression coil spring 3. Alternatively, as shown in FIG. 4C, the piston 2 and the string member 5 may be formed of hard synthetic resin, and an O-ring 12 may be attached to an outer circumference of the piston 2.

Figure 5:
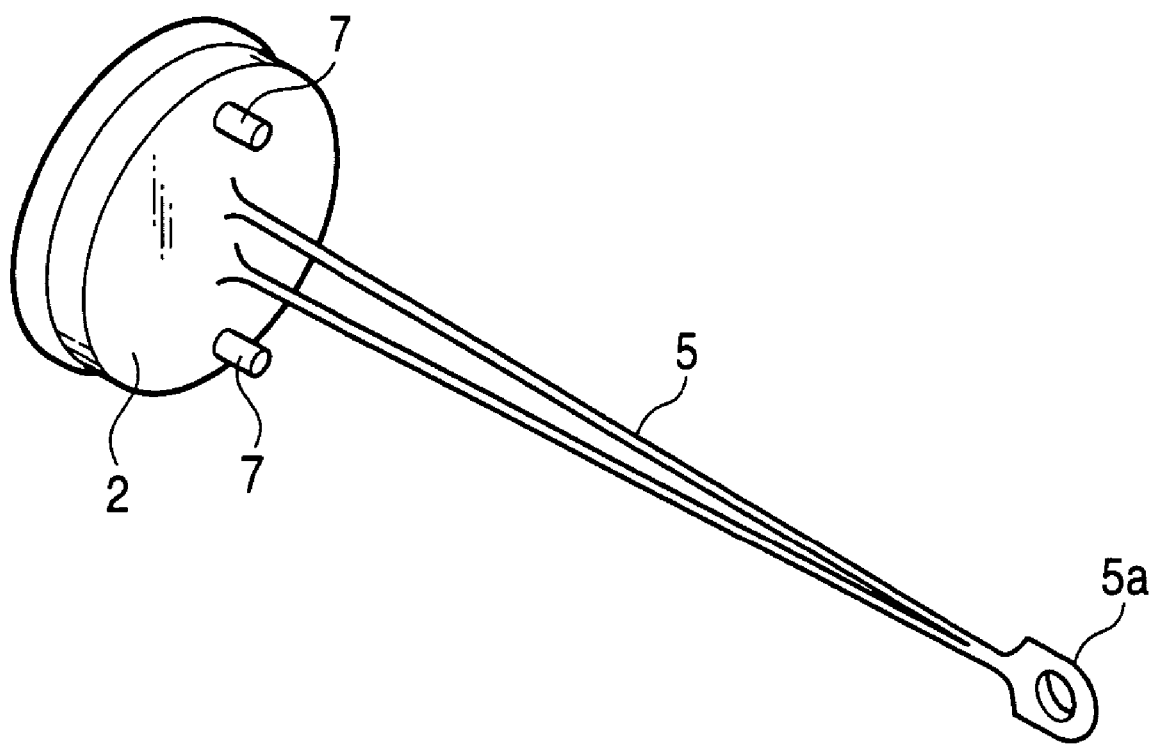
FIG. 5 is a perspective view showing a relation between the piston and the string member provided for the second embodiment of the present invention.

Next, a string type air damper according to a second embodiment will be explained below. The string type air damper according to the second embodiment is essentially the same as that according to the first embodiment. Differences therebetween are described as follows. As shown in FIG. 5, the elongated string member 5 having the small diameter branches into two portions on the base end portion side thereof and is integrally connected with the piston 2. The two portions branched from the string member 5 come together at the forward end portion 5a. Accordingly, in this case, the string member 5 branching into the two portions supports the piston 2. Therefore, the piston 2 can be stably moved in the cylinder 1.

Figure 6A:
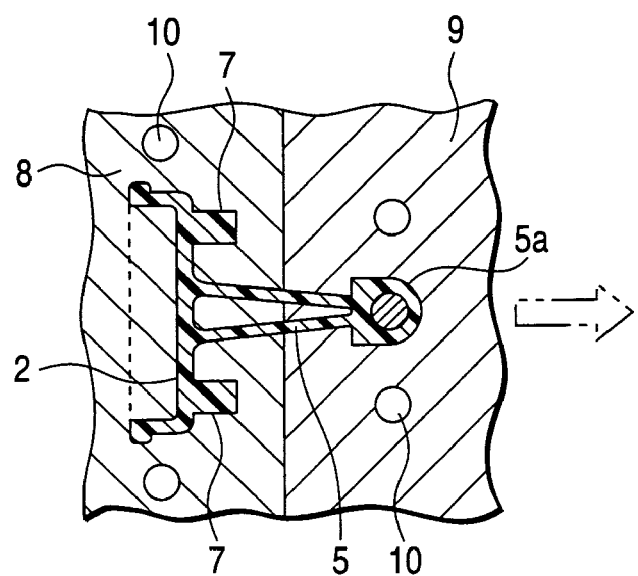
FIGS. 6A and 6B are schematic illustrations showing a process in which the piston and the string member are integrally formed by means of injection molding and then the string member is elongated.
Figure 6B:
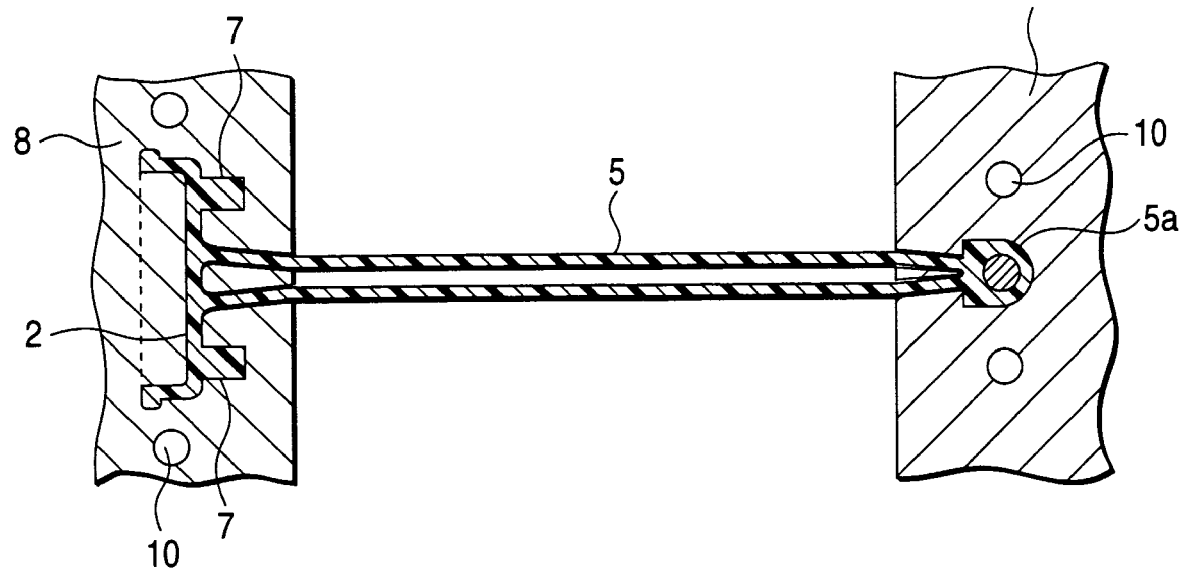

In the second embodiment, in the case where the piston 2 and the string member 5 are integrally molded, as shown in FIG. 6A, the piston 2 and the string member 5 having the large diameter and the short length are integrally formed by means of injection molding using the metallic mold 8 for molding the piston and the metallic mold 9 for molding the forward end portion of the-string member 5. After the completion of injection molding, as shown in FIG. 6B, when the metallic mold 9 for molding the forward end portion of the string member 5 is linearly moved away from the metallic mold 8 for molding the piston, the string member 5 having the large diameter and the short length is elongated to make the string member have the small diameter and the long length.

Figure 7:
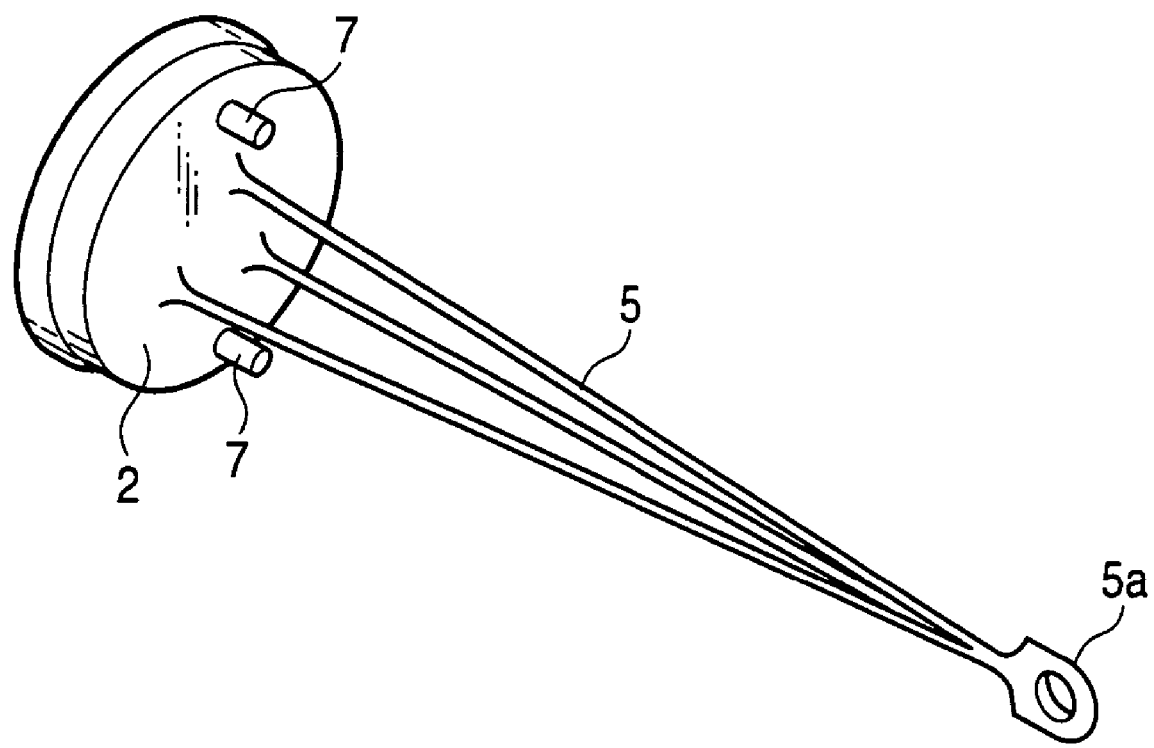
FIG. 7 is a perspective view showing another example according to the second embodiment.

In the second embodiment, the string member 5 branches into the two portions. However, it should be noted that the present invention is not limited to the above specific embodiment. For example, as shown in FIG. 7, it is possible to make the string member 5 branch into three portions or more portions. In this case, the string member 5 branching into the plurality of portions supports the piston 2. Therefore, it is needless to say that the piston 2 can be stably moved in the cylinder 1.

Figure 8:
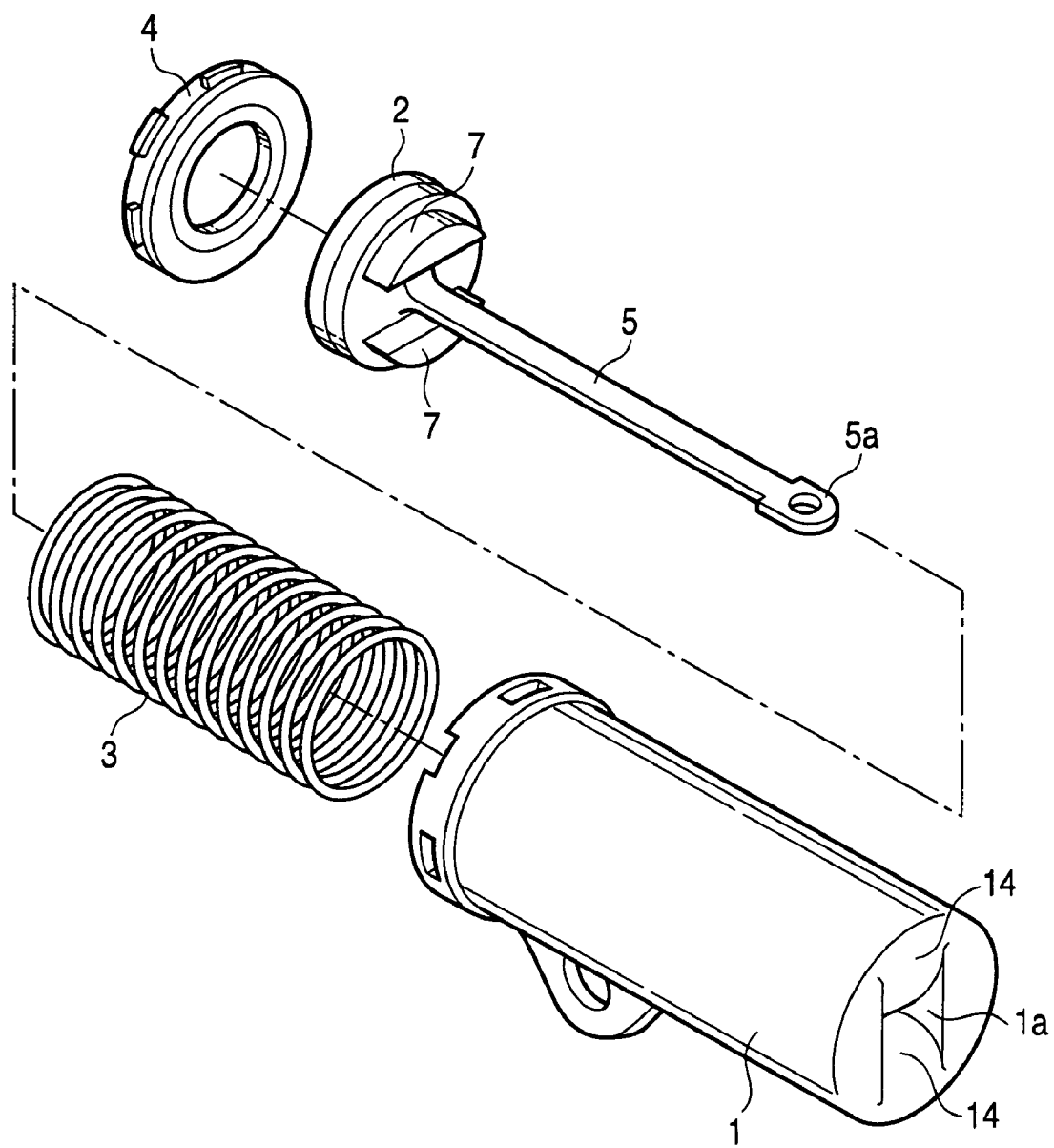
FIG. 8 is an exploded perspective view of the string type air damper according to the third embodiment of the present invention.
Figure 9A:
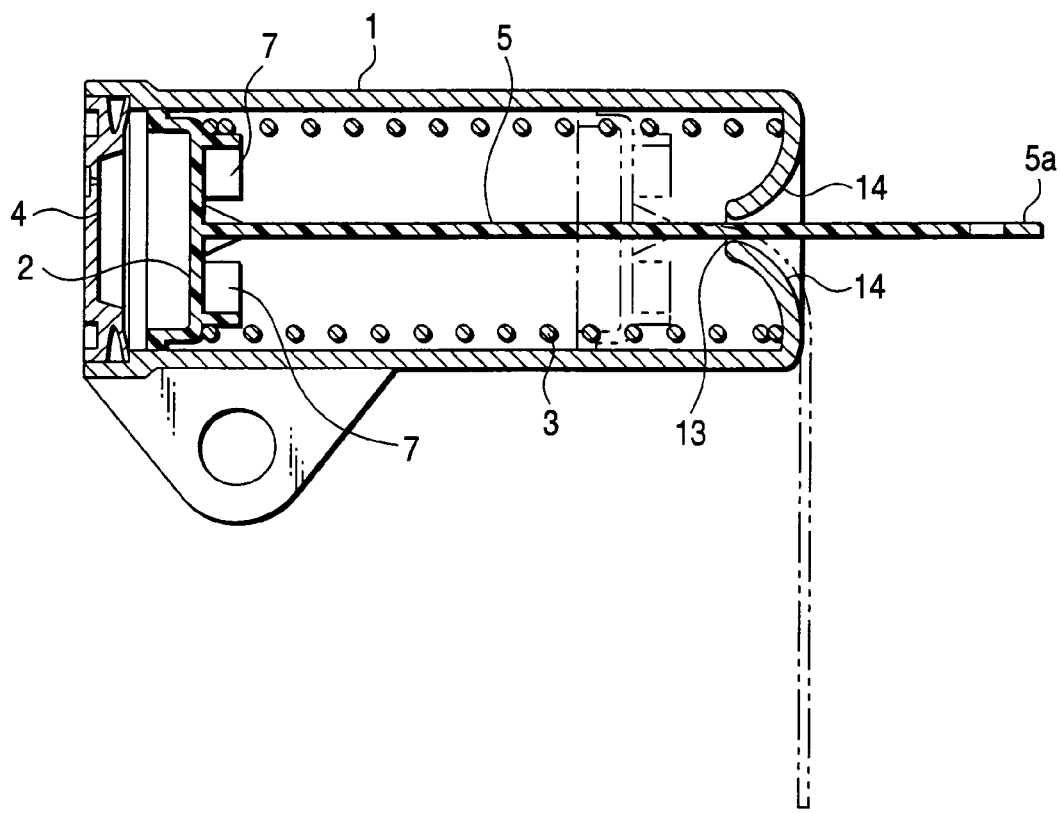
FIG. 9A is a sectional view showing a state of assembling of the string type air damper according to the second embodiment of the present invention.
Figure 9B:
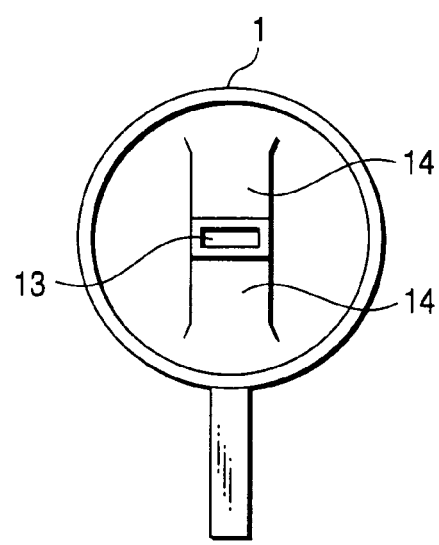
FIG. 9B is a side view showing a guide hole of the cylinder.

Next, a string type air damper according to a third embodiment will be explained below. The string type air damper according to the third embodiment is essentially the same as that according to the first embodiment. Differences therebetween are described as follows. As shown in FIG. 8, the elongated string member 5 having the small diameter has a belt-shape. The belt-shaped string member 5 is integrally connected with the piston 2. On the other hand, as shown in FIGS. 9A and 9B, the guide hole 1a of the cylinder 1 is provided with a flat opening 13 and a smooth arcuate face 14 continuing to the wide edge of the opening 13, so that the belt-shaped string member 5 can be bent and guided along the arcuate face 14.

Even in the third embodiment, when the piston 2 and the string member 5 are integrally molded, the above manufacturing process is adopted. Especially, in the third embodiment, the string member 5 is formed into a belt-shape, so that the string member 5 itself can be strengthened. Further, the string member 5 can be flexibly bent and guided along the arcuate face 14 of the guide hole 1a.

Figure 10:
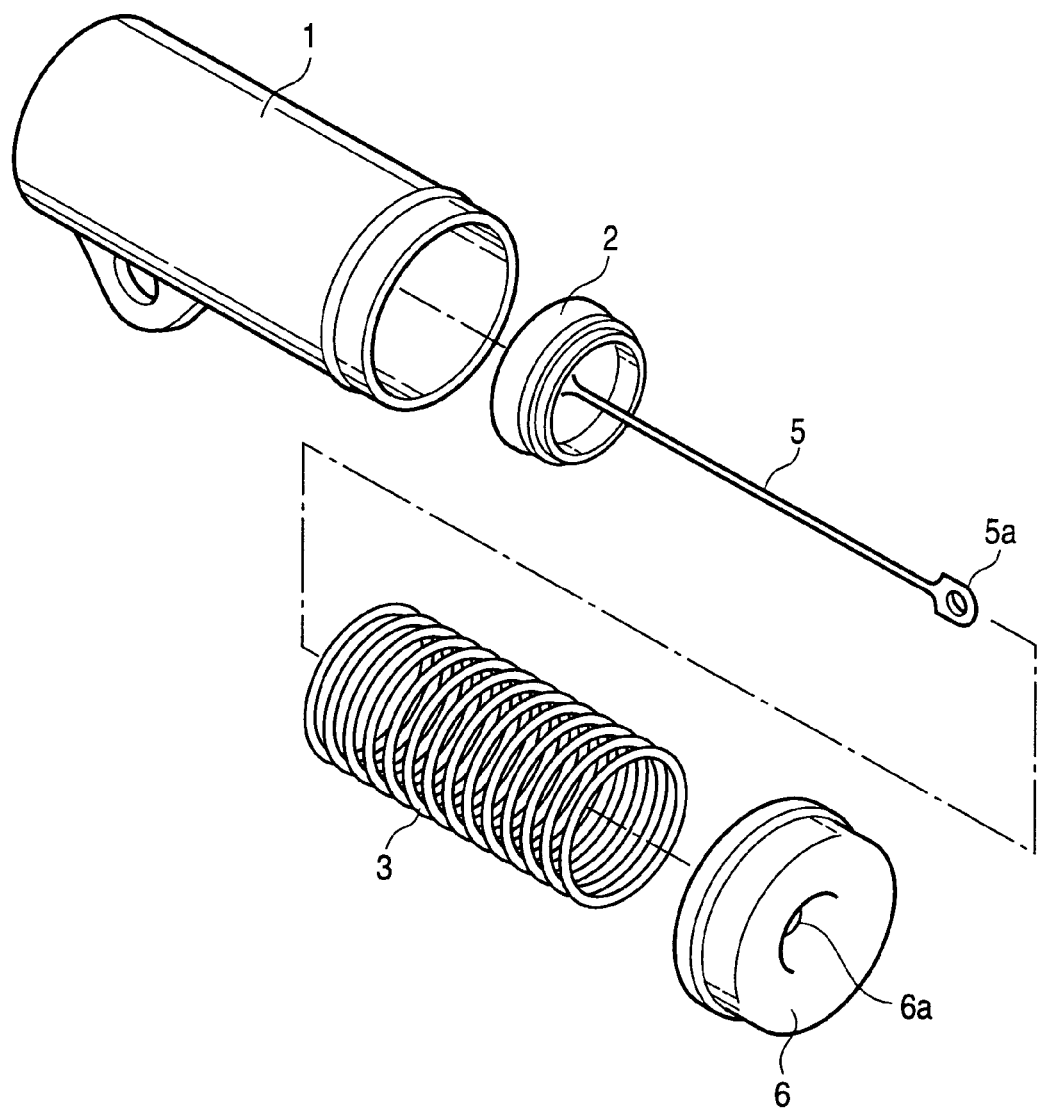
FIG. 10 is an exploded perspective view of the string type air damper according to the fourth embodiment of the present invention.
Figure 11A:
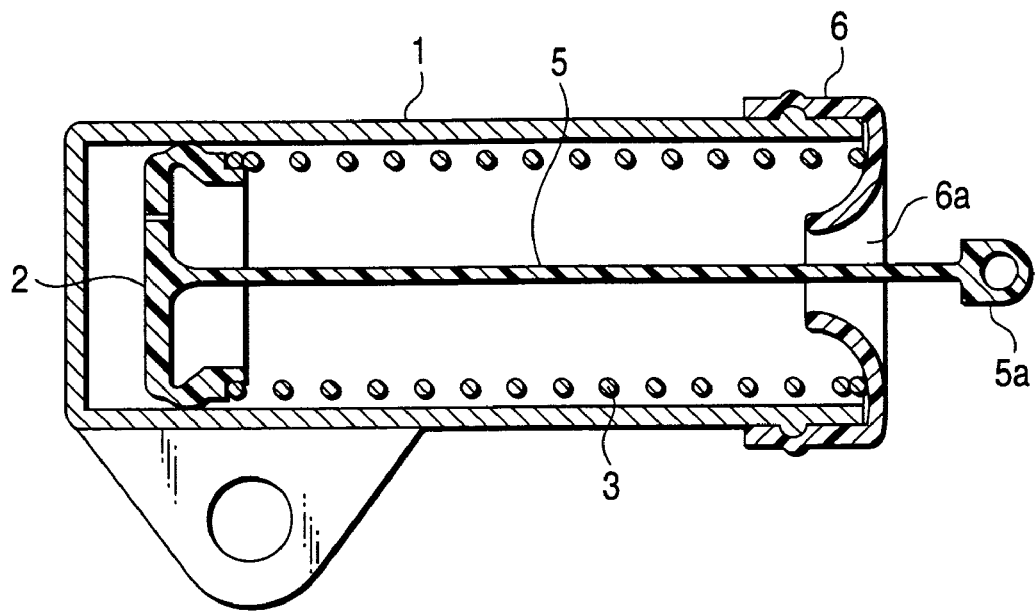
FIG. 11A is a sectional view showing a relation between the cylinder and the piston in the case where operation is not conducted.
Figure 11B:
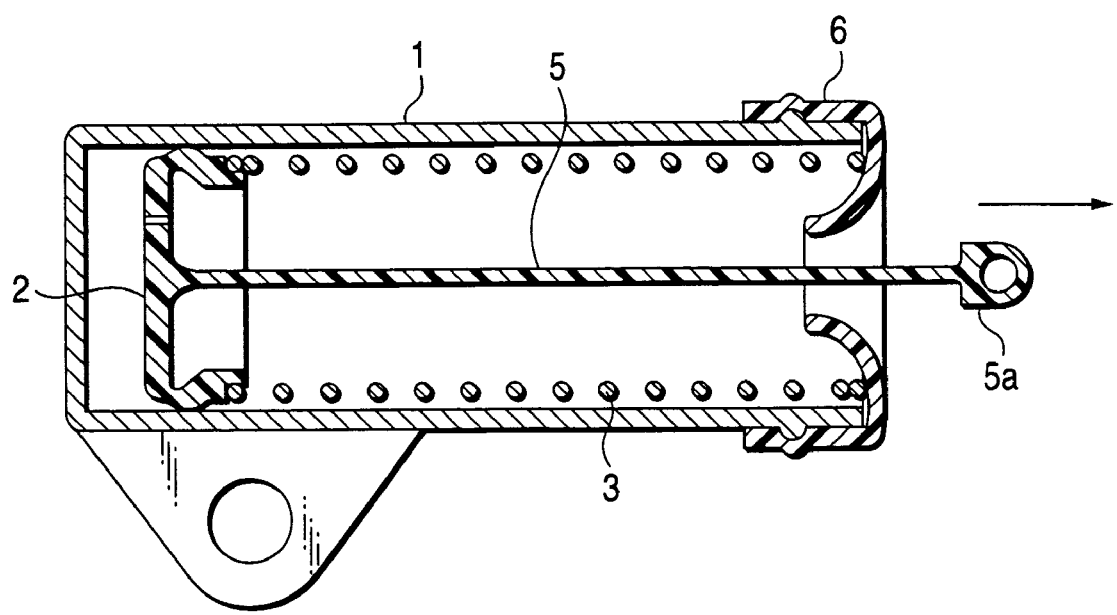
FIG. 11B is a sectional view showing a relation between the cylinder and the piston in the case where operation is conducted.

A string type air damper according to a fourth embodiment will be explained below. The fourth embodiment is different from the embodiments explained before. As shown in FIG. 10, the string type air damper according to the fourth embodiment includes a guide gap 6, which is separately molded and defines a guide hole 6a. The guide gap 6 is attached to one end portion of the cylinder 1. The piston 2 molded integrally with the string member 5 can bend in an outer diameter direction. In the case where the air damper does not operate, as shown in FIG. 11A, an inner face of the cylinder 1 and an outer face of the piston 2 are not contacted with each other. However, in the case where the air damper operates in such a manner that the string member 5 is drawn out from the guide hole 6a of the guide cap 6, as shown in FIG. 11B, the piston 2 is deformed and expanded by a pressure of the helical compression spring 3, and the outer face of the piston 2 comes into contact with the inner face of the cylinder 1.

Figure 12:
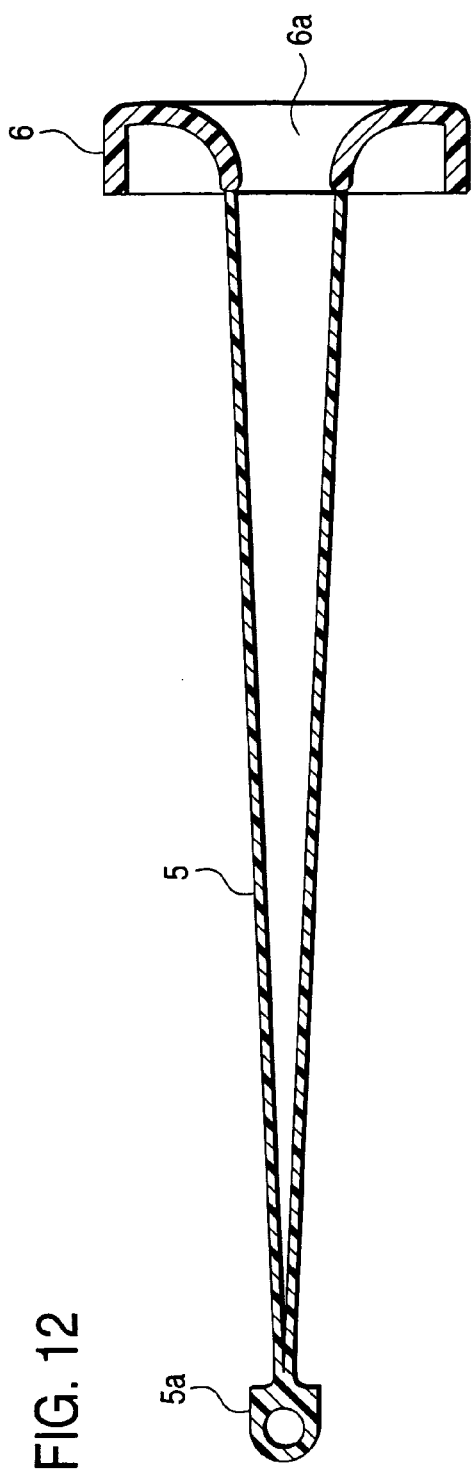
FIG. 12 is a sectional view showing a relation between the guide cap and the string member provided for the fifth embodiment of the present invention.

Finally, a string type air damper according to a fifth embodiment will be explained below. In the fifth embodiment, the piston 2 and the string member 5 are not integrally molded, but as shown in FIG. 12, the guide cap 6 and the string member 5 are integrally molded and hooked at a hook portion 15 provided at the piston 2, and then the forward end portion 5a is guided outside through the guide hole 6a of the guide cap 6.

In this case, although a specific structure is not shown in the drawing, the guide cap 6 and the string member 5 having the large diameter and the short length are integrally molded by means of injection molding using the metallic mold for forming the guide cap and the metallic mold 9 for molding the forward end portion of the string member 5. After the completion of injection molding, when the metallic mold 9 for molding the forward end portion of the string member 5 is linearly moved away from the metallic mold for molding the guide cap, the string member 5 having the large diameter and the short length is elongated to make the string member have the small diameter and the long length. In the fifth embodiment, the string member branches into two portions on the base end portion side and integrally connected with the guide hole 6a edge of the guide cap 6.

Figure 13:
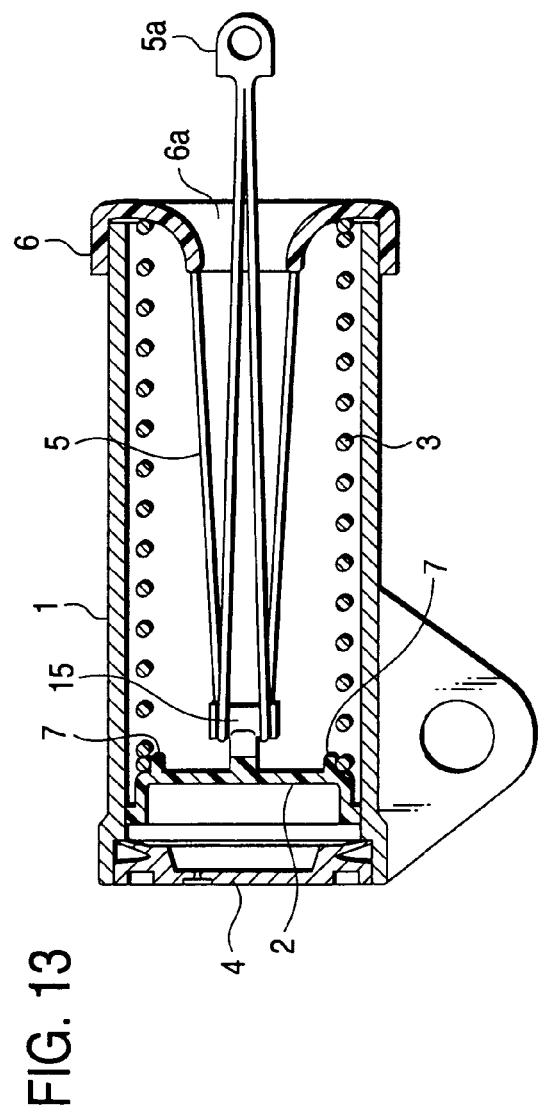
FIG. 13 is a sectional view showing a state of assembling of the string type air damper according to the fifth embodiment of the present invention.

Therefore, the string type air damper according to the fifth embodiment is assembled as follows. As shown in FIG. 13, while an intermediate portion of the string member 5, which branches into the two portions, is being hooked at both sides of the hook portion 15 of the piston 2, the forward end portion 5a at which the string member 5 comes together is guided outside through the guide hole 6a of the guide cap 6. In the above condition, the helical compression spring 3 and the piston 2 are inserted into the cylinder 1. Then, the guide cap 6 is attached to one end portion of the cylinder 1. At the same time, the end cap 4 is attached to the other end portion thereof. In this way, the string type air damper can be simply assembled. In the fifth embodiment, it is necessary to attach the hook portion 15 on the piston 2 side. However, unlike the string type air damper according to the related art, it is unnecessary to form a loop at the base end portion of the string member with a complicated work. Further, it is unnecessary to hook the loop-shaped base end portion of the string member at the hook portion of the guide cap. Therefore, the string type air damper can be easily assembled.

As described above, according to the present invention, the string member is molded integrally with the piston. Therefore, unlike the string type air damper according to the related art, it is unnecessary to form a loop at the base end of the string member with a complicated work. Also, it is unnecessary to form a hook portion in the piston and to hook the loop-shaped base end of the string member at the hook of the guide cap. Accordingly, the string type air damper can be very easily assembled.

Further, the string member and the guide cap are integrally molded and the forward end portion of the string member is hooked at the piston and then introduced outside. Therefore, unlike the string type air damper according to the related art in which a loop is formed at the base end portion of the string member and the thus formed loop-shaped base end portion of the string member is hooked at the hook portion arranged in the piston being accompanied by a complicated work, it is unnecessary to do the above complicated work in the present invention. Accordingly, the string type damper can be easily assembled.

What is claimed is:
1. A string type air damper comprising:
 a cylinder formed in a tubular shape, defining a guide hole at one end portion thereof;
 a monolithic piston having a string member portion, which moves in the cylinder;
 a helical spring for biasing the piston toward the other end portion of the cylinder; and
 the string member portion guided from inside of the cylinder to outside thereof through the guide hole,
 wherein the string member portion has a flat belt shape, wherein the guide hole of the cylinder has a flat opening and a smooth arcuate face continuing to a wide width edge of the opening so that the belt-shaped string member is bendable and guidable along the arcuate face, wherein the string member portion having the belt shape is bent and guided along the arcuate face of the guide hole, and wherein the cylinder comprises a non-removable closed end and the guide hole is formed in the non-removable closed end of the cylinder.

2. A string type air damper comprising:

a cylinder formed in a tubular shape, defining a guide hole at one end portion thereof;

a monolithic piston having a string member portion, which moves in the cylinder;

a helical spring for biasing the piston toward the other end portion of the cylinder; and the string member portion guided from inside of the cylinder to outside thereof through the guide hole, wherein the string member portion has a flat belt shape, wherein the guide hole of the cylinder has a flat opening and a smooth arcuate face continuing to a wide width edge of the opening so that the belt-shaped string member is bendable and guidable along the arcuate face, the string member portion having the belt shape is bent and guided along the arcuate face of the guide hole, and wherein the string member portion passes through a non-removable closed end of the cylinder.

3. A string type air damper comprising: a cylinder formed in a tubular shape, defining a guide hole at one end portion thereof; a piston, which moves in the cylinder; a helical spring for biasing the piston toward the other end portion of the cylinder; and a string member guided from inside of the cylinder to outside thereof through the guide hole, wherein: the piston and the string member are integrally molded; the string member branches into a plurality of portions and connects with the piston at a base end portion thereof; the portions come together at a forward end portion of the string member; and the plurality of portions of the string member connect with different positions on the piston.

4. The string type air damper according to claim 3, further comprising an end cap attached to the other end portion of the cylinder.

5. The string type air damper according to claim 3, further comprising a mount integrally formed on the piston for receiving an end portion of the helical compression spring.

6. A string type air damper comprising: a cylinder formed in a tubular shape; a piston, which moves in the cylinder; a helical spring for biasing the piston toward one end portion of the cylinder; a guide cap attached to the other end portion of the cylinder and defining a guide hole; and, a string member guided from inside of the cylinder to outside thereof through the guide hole, wherein: the guide cap and the string member are integrally molded; the string member is hooked to the piston within the cylinder and is guided to the outside thereof; the string member branches into a plurality of portions; a base end portion of the string member is connected to the guide cap; and the plurality of portions of the string member are connected to different positions on the guide cap.

7. The string type air damper according to claim 6, wherein: the plurality of portions comes together at a forward end portion of the string member; and the portions are hooked at the piston.

8. The string type air damper according to claim 6, further comprising a mount integrally formed on the piston for receiving an end portion of the helical compression spring.

* * * * *